United States Patent [19]

Haldeman et al.

[11] Patent Number: 4,997,608

[45] Date of Patent: Mar. 5, 1991

[54] MOLDING POLYTETRAFLUOROETHYLENE

[75] Inventors: Charles W. Haldeman, Concord; Adam A. Brailove, Boston, both of Mass.

[73] Assignee: Massachusetts Institute of Technology, Cambridge, Mass.

[21] Appl. No.: 418,140

[22] Filed: Oct. 6, 1989

[51] Int. Cl.⁵ .................................. B29C 43/14
[52] U.S. Cl. .................................. 264/120; 264/122; 264/126; 264/127
[58] Field of Search ............... 264/120, 122, 126, 127, 264/313, 314, 60, 65; 425/405.2

[56] References Cited

U.S. PATENT DOCUMENTS

| | | | |
|---|---|---|---|
| 4,009,977 | 3/1977 | Chao | 425/78 |
| 4,142,888 | 3/1979 | Rozmus | 75/201 |
| 4,536,366 | 8/1985 | Inoue | 419/11 |
| 4,615,859 | 10/1986 | Traut | 264/570 |
| 4,615,933 | 10/1986 | Traut | 428/252 |
| 4,820,663 | 4/1989 | Mehrotra et al. | 501/87 |
| 4,840,763 | 6/1989 | Freitag | 264/65 |

Primary Examiner—Mary Lynn Theisen
Attorney, Agent, or Firm—Fish & Richardson

[57] ABSTRACT

A process for producing a workpiece by compacting powder material, includes the steps of applying compression to the material along selected preferably orthogonal axes in compression steps, each compression step causing a volume reduction selected to produce the desired final compaction and orientation of material in the workpiece for that axis.

24 Claims, No Drawings

MOLDING POLYTETRAFLUOROETHYLENE

BACKGROUND OF THE INVENTION

The Government has rights in this invention pursuant to Grant Number AF19628-85-C-0002 awarded by the Air Force.

The present invention relates to molding of polytetrafluoroethylene (PTFE) to construct mechanical and electrical parts.

When PTFE material is compressed uniaxially, the resulting material is not isotropic, such that certain given properties are different when measured parallel to or perpendicular to the pressing axis. For example, elongation to failure is typically 100% parallel to the pressing axis and 500% perpendicular to the pressing axis, such as when compressing PTFE material including a blend of long fibers.

In fact, with such pressing, the usual result is a material whose dielectric constant is much greater when the electric field is perpendicular to the pressing axis compared to when it is parallel thereto. This type of anisotropy is common to pressed and molded parts fabricated from powders (including plastics, metals and ceramics), and is usually eliminated by using an isostatic pressing process.

Isostatic pressing processes may include hot or cold pressing, as long as a suitable containment material is used. The resulting molded item typically has an uneven shape after the pressing operation, and can be machined into final form.

A conventional isostatic pressing process for the formation of PTFE material parts, such as disclosed in Von Aelst, F., Isostatisch Persen Van PTFE Artikelen, Belgian Plastics, Nov. 13, 1970, pp. 60-63, includes placing PTFE powder in a flexible receiver, such as in a deformable bag, and simultaneously compressing the bagged powder in all directions by external hydrostatic pressure. The advantage of isostatic pressing is that the resulting ingot (or "part") is isotropic (e.g., substantially structurally and/or electrically uniform along various axes).

SUMMARY OF THE INVENTION

In one aspect of the invention, a process for producing a workpiece by compacting powder material, or mixtures of powder and filler material, includes applying compression to the material along preferably orthogonal axes in sequential steps, each compression step having a volume reduction selected to produce the desired final compaction and orientation of material in the workpiece for that axis. One compression step may include a uniform radial reduction where another compression step is purely axial. Preferably, there are at least two compression steps, each along a respective axis, the first for radial and circumferential compression and the second for axial compression.

In another aspect of the invention, a process for producing a shaped workpiece includes the steps of placing material to be compressed in a compressor and compressing the material along a first axis, compressing the compressed material along a second axis orthogonal to the first axis, and compressing the twice compressed material a third time along an additional axis orthogonal to at least one of the first two axes to form the shaped workpiece.

Any of these aspects may include the following features: In one embodiment, the temperature and pressure are maintained, for the final axis of compression, as follows:

| Pressure | Temperature °C | Time - hrs |
|---|---|---|
| 500 psi | 20-372 | 4 |
| 500 psi | 372 | 4 |
| 500 psi | 372-330 | 1 |
| 500 psi | 330-290 | 0.25 |
| 500 psi | 290 | 1 |
| 500 psi | 290-190 | 1 |
| 500 psi-0 psi | 190-20 | 1 |

In another embodiment, the powder is compressed, for the final axis, at 20° C. to 6000 psi and held for about one hour; thereafter, the pressure is released and the workpiece is sintered, as follows:

| Temp °C | Time hours |
|---|---|
| 21 to 149 | 8 |
| 149 | 16 |
| 149 to 372 | 16 |
| 372 | 16 |
| 372 to 330 | 1 |
| 330 | 8 |
| 330 to 290 | 1 |
| 290 | 4 |
| 290 to 21 | 24 |

The powder may be PTFE powder, and the filler may be carbon fiber material.

The first compression may include a uniform radial reduction of a factor of about 1.6 to 1.8 of initial to final radius, later followed by a compression which is purely axial by a reduction factor of about 1.6 to 1.2. Preferably, the first compression includes a uniform radial reduction by a factor of 1.8, with another compression which is purely axial having a reduction factor of about 1.2.

The radial reduction may be by a factor of about $\sqrt[3]{X}$, where X is the ratio of initial to final volume of the desired volumetric compression. Preferably, all compressions are reduced by a factor of about $\sqrt[3]{X}$.

DETAILED DESCRIPTION

The present invention embraces a new isostatic pressing method for molding of powder into a part exhibiting substantial isotropy. In a preferred embodiment, the powder is compressed in two separate steps. As a first step, a quantity of powder is loaded into a cylindrical container, and the powder is compressed radially only. The radial reduction in this step is preferably by a factor expressed as $\sqrt[3]{X}$, where X is the ratio of initial to final volume of the desired volumetric compression, typically 1.59.

In a second step, the resulting partially compressed cylinder is loaded into a cylindrical die and is compressed axially, preferably by the same factor. This can be done either in a hot or cold process.

In a preferred hot pressing process in practice of the invention, for of compression, 500 psi is applied to a piston in the die by a pneumatic system which can permit this pressure to be established during the thermal expansion of the part. Respectively for each axis of compression, the temperature and pressure are established according to the following schedule:

| SCHEDULE 1 | | |
|---|---|---|
| Pressure | Temperature °C. | Time - hrs |
| 500 psi | 20-372 | 4 |
| 500 psi | 372 | 4 |
| 500 psi | 372-330 | 1 |
| 500 psi | 330-290 | 0.25 |
| 500 psi | 290 | 1 |
| 500 psi | 290-190 | 1 |
| 500 psi-0 psi | 190-20 | 1 |

In a preferred cold pressing process in practice of the invention, in the final axis of compression, the part is compressed at 20° C. to 6000 psi and held for one hour. The pressure is released, the part is removed from the die, and it is inserted in a circulating air oven at 20° C. The closed oven is heated according to the following schedule:

| SCHEDULE 2 | |
|---|---|
| Temp °C | Time hours |
| 21 to 149 | 8 |
| 149 | 16 |
| 149 to 372 | 16 |
| 372 | 16 |
| 372 to 330 | 1 |
| 330 | 8 |
| 330 to 290 | 1 |
| 290 | 4 |
| 290 to 21 | 24 |

The invention enables production of a final molded part which is a smooth, solid cylinder. In some cases, where there are initial spaces between grains in the starting powder, more than the typical radial reduction of 1.59 may be preferred to achieve uniform compression. For example, with fiber-filled PTFE powder, some anisotropy remains when a factor of 1.59 is used; nearly perfect isotropic results have been obtained, however, using an initial radial reduction of about 1.8 followed by an axial reduction of about 1.2.

In one example, a sample of carbon fiber loaded PTFE powder was in the first step placed into a commercial piston ring compressor (a device for reducing the diameter of a cylinder formed from overlapping thin steel strips using contracting external tension bands) preset to a diameter of 4.75 inches. The ends of the cylinder were covered tightly with flat PTFE plates, and the diameter was reduced to slightly less than three inches by tightening the compressor. A normal compression of 4.75/3 = 1.58 in each of the x and y directions perpendicular to the cylinder axis was achieved.

In the second step, the preformed cylinder was then loaded into a three inch diameter steel die and cold pressed axially at 6,000 psi for one hour. It was then sintered at temperatures up to 372° C. according to Schedule 2.

Dielectric samples cut from the resulting block showed differences of only 20 to 30 percent between measurements with the electric field parallel and perpendicular to the axis of the final pressing, while a similar sample prepared using only one axial compression (i.e., uniaxial pressing) exhibited a 300 percent difference in the corresponding dielectric measurements. In another example, the first stage radial reduction was increased to 1.7. The dielectric constant was isotropic within about 5 percent.

The process of the invention may be understood as a simple co-ordinate transformation in which each stage of the compression is a shortening of all dimensions parallel to the axis of compression. Thus, the result of equilinear reductions in several coordinate directions will be the same regardless of the order in which they take place. If the full reduction takes place only in one direction, e.g., if the material is compressed by monostatic or uniaxial pressing, dimensions in this one direction are shrunk accordingly with the fibers preferentially aligned perpendicular to the pressing axis. However biaxial or triaxial compression produces a randomness of fiber orientation resulting in the desired isotropy.

In the bistatic method of the present invention, the first stage combines radial and circumferential reduction and tends to align fibers with the pressing axis. The subsequent axial compression of the second stage tends to realign the fibers perpendicular to the pressing axis and results in an isotropic workpiece where the fibers have assumed a random arrangement. Also, this method can yield a workpiece without requiring much, if any, extra machining.

In a further embodiment of the present invention, it is possible to use a three-step process of triaxial isotropic compression in which reduction takes place sequentially in each of three orthogonal directions. The relative amount of the total compression can be varied to produce the desired orientation of fibers in the finished product.

Other embodiments are within the claims.

What is claimed is:

1. A process for producing a workpiece having an axis by compacting powder material, comprising the steps of
applying compression to the material uniformly in a radial direction to produce radially compressed material, and
compressing the radially compressed material in a axial direction along said axis to a final density.

2. The process of claim 1 wherein the material is loaded into a cylindrical container before the first compression.

3. The process of claim 1 wherein the second compression step causes a purely axial reduction.

4. The process of claim 3 wherein each compression step causes a volume reduction selected to produce the desired final compaction and orientation of the material in the workpiece for that respective compaction axis.

5. The process of claim 1 wherein the powder material is PTFE and includes filler material.

6. The process of claim 5 wherein the filler is carbon fiber material.

7. The process of claim 2 wherein the compressed powder material before axial compression is loaded into a cylindrical die.

8. The process of claim 1 wherein the radial and axial compressions are along respective axes which are orthogonal to each other.

9. The process of claim 1 wherein the radial reduction is by a factor of $\sqrt[3]{X}$, where X is a ratio of initial to final volume of desired volumetric compression.

10. The process of claim 1 wherein the axial reduction is by a factor of $\sqrt[3]{X}$, where X is a ratio of initial to final volume of desired volumetric compression.

11. The process of claim 1 wherein the powder is compressed axially at 20° C. to a pressure of 6000 psi and held for about one hour, thereafter the pressure is released and the workpiece is sintered.

12. The process of claim 1 wherein the first compression step causes a uniform radial reduction by a factor of about 1.6 to 1.8 of initial to final radius, followed by a second compression step which causes a purely axial reduction by a factor of about 1.6 to 1.2.

13. The process of claim 2 wherein the uniform radial reduction factor is substantially 1.8 and the purely axial reduction factor is about 1.2.

14. The process of claim 1 further comprising the step of sintering the workpiece.

15. A process for producing a workpiece in compression powder material, comprising
   applying compression to the material in compression steps along respective axes,
   each compression step causing a volume reduction selected to produce the desired final compaction and orientation of material in the workpiece for that respective axis, and
   wherein temperature and pressure are maintained, for at least one axis of compression, as follows:

| Pressure | Temperature °C | Time - hrs |
|---|---|---|
| 500 psi | 20-372 | 4 |
| 500 psi | 372 | 4 |
| 500 psi | 372-330 | 1 |
| 500 psi | 330-290 | 0.25 |
| 500 psi | 290 | 1 |
| 500 psi | 290-190 | 1 |
| 500 psi-0 psi | 190-20 | 1 |

16. A process for producing a workpiece by compacting powder material, comprising,
   applying compression to the material in compression steps along respective axes,
   each compression step causing a volume reduction selected to produce the desired final compaction and orientation of material in the workpiece for that respective axis,
   wherein one compression step includes causing a uniform radial reduction and another compression step causes a purely axial reduction, and
   wherein the powder is compressed, for at least one axis, at 20° C. to a pressure of 6000 psi and held for about one hour, thereafter the pressure is released and the workpiece is sintered, as follows:

| Temp °C | Time hours |
|---|---|
| 21 to 149 | 8 |
| 149 | 16 |
| 149 to 372 | 16 |
| 372 | 16 |
| 372 to 330 | 1 |
| 330 | 8 |
| 330 to 290 | 1 |
| 290 | 4 |
| 290 to 21 | 24 |

17. A process for producing a workpiece by compacting powder material, comprising,
   applying compression to the material in compression steps along respective axes,
   each compression step causing a volume reduction selected to produce the desired final compaction and orientation of material in the workpiece for that respective axis, and
   wherein the first compression step causes a uniform radial reduction by a factor of about 1.6 to 1.8 of initial to final radius, followed by a second compression step which causes a purely axial reduction by a factor of about 1.6 to 1.2.

18. The process of claim 17 wherein the uniform reduction factor is substantially 1.8 and the purely radial reduction factor is about 1.2.

19. A process for producing a shaped workpiece, comprising the steps of
   (a) placing material to be compressed in a compressor and compressing the material along a first axis,
   (b) compressing the compressed material along a second axis orthogonal to the first axis, and
   (c) compressing the twice compressed material a third time along an additional axis orthogonal to one of the first two axes to form the shaped workpiece,
   wherein compression along one of said axes is radial and provides a radial reduction by a factor of about $\sqrt[3]{X}$, where X is the ratio of initial to final volume of the desired volumetric compression of said material.

20. The process of claim 19 wherein the reduction produced by compression along each of said axes is by about $\sqrt[3]{X}$.

21. A process for producing a workpiece by compacting powder material, comprising
   applying compression to the material in compression steps along respective axes,
   each compression step causing a volume reduction selected to produce the desired final compaction and orientation of material in the workpiece for that respective axis,
   wherein compression along one of said axes provides a radial reduction by a factor of about $\sqrt[3]{X}$, where X is the ratio of initial to final volume of the desired volumetric compression of said material.

22. The process of claim 21 wherein the reduction produced by compression along each of said axes is by about $\sqrt[3]{X}$.

23. A process of forming a workpiece having an axis from a powder charge having fibrous material, comprising the steps of:
   compressing the charge radially relative to said axis in a radial compression axis to align the fibers generally along the radial compression axis to form a radially compressed charge, and
   axially compressing the radially compressed charge to realign at least a portion of the fibers perpendicular to the radial compression axis to place the fibers in a generally random arrangement.

24. The process of claim 23 wherein the powder is carbon fiber filled PTFE.

* * * * *